United States Patent [19]
Gebelin et al.

[11] Patent Number: 4,741,878
[45] Date of Patent: May 3, 1988

[54] PROCESS AND DEVICE FOR INSPECTING CONTROL ROD CLUSTERS FOR NUCLEAR FUEL ASSEMBLIES

[75] Inventors: Bernard Gebelin, Villeurbanne; Roger Couture, Tassin la Demi-Lune, both of France

[73] Assignee: FRAGEMA, Courbevoie, France

[21] Appl. No.: 890,423

[22] Filed: Jul. 29, 1986

[30] Foreign Application Priority Data

Aug. 1, 1985 [FR] France ............... 85 11781

[51] Int. Cl.⁴ .............................................. G21C 17/00
[52] U.S. Cl. ....................................... 376/248; 376/245
[58] Field of Search ............... 376/260, 248, 249, 251, 376/252, 245, 450; 73/622, 637, 643; 324/240, 242, 237, 238, 226, 227

[56] References Cited

U.S. PATENT DOCUMENTS

| | | |
|---|---|---|
| 4,036,686 | 7/1977 | Weilbacher et al. ............... 376/251 |
| 4,048,009 | 9/1977 | Weilbacher .......................... 376/245 |
| 4,197,652 | 4/1980 | Qurnell et al. ..................... 376/245 |
| 4,449,411 | 5/1984 | Suhr et al. ........................... 324/226 |
| 4,450,725 | 5/1984 | Yamaguchi et al. .................. 73/643 |
| 4,464,332 | 8/1984 | Boisseuil et al. .................... 376/248 |
| 4,562,738 | 1/1986 | Nakayama et al. .................. 73/637 |
| 4,605,531 | 8/1986 | Leseur et al. ........................ 376/252 |
| 4,647,422 | 3/1987 | Altman ................................. 376/249 |

FOREIGN PATENT DOCUMENTS 0059301  9/1982  European Pat. Off. ............ 376/245

OTHER PUBLICATIONS

"The Eddy-Sonic Test Method", *Materials Evaluation*, Botsco, 2/68, pp. 21-26.
"Eddy Current Testing of Stainless Steel Nuclear Fuel Cladding Tubes", *Nat. Inst. Metals*, Ito et al., 11/73, pp. 8-17.

Primary Examiner—Deborah L. Kyle
Assistant Examiner—Daniel Wasil
Attorney, Agent, or Firm—Pollock, Vande Sande & Priddy

[57] ABSTRACT

A device for inspecting the rods of a cluster which is insertable into the core of a nuclear reactor has a body with a guide for indexing the cluster in m different angular positions. The body includes a support plate which is traversed by the rods during movement in the body and carries n/m eddy current coils (n being the total number of rods in the group). The device is associated with a data processor and with ultrasonic and optical examination systems. Optical examination is carried out on one rod at a time while it is moved longitudinally through the body.

13 Claims, 8 Drawing Sheets

PROCESS AND DEVICE FOR INSPECTING CONTROL ROD CLUSTERS FOR NUCLEAR FUEL ASSEMBLIES

FIELD OF THE INVENTION

The invention relates to inspection of the rods which constitute clusters which are insertable in the core of a nuclear reactor, and more particularly to an inspection process and a device which makes possible a first examination of all rods in order to determine their degree of wear and then to complete this first examination by a visual inspection and/or a measurement by another process.

PRIOR ART

The invention is particularly suitable for use in the inspection of rods of a control rod cluster which is insertable in a fuel assembly for a light water cooled and moderated nuclear reactor. In such a reactor, use is made of control clusters each of which has a bundle of neutron absorbing rods; each bundle may for instance have twenty-four rods, which are carried by the arms of an upper handling member which is generally called a spider. Certain of the rod clusters are for fine reactivity control while the nuclear reactor is in normal operation and, in particular, make it possible to vary the thermal power. Other clusters contain burnable poison and are introduced into the core only during a first cycle of the core. In other groups, the rods may simply constitute plugs whose function is to close guide tubes provided in the fuel assemblies and to limit the coolant flow therein.

The control rods should periodically be checked to detect possible surface defects. Particularly in clusters whose degree of insertion in the core is frequently modified, it is desirable to verify the amount of wear in order to determine, sufficiently early, the risk of failure of the sheath or the extent of its deterioration. Such monitoring is particularly useful when the power station is used in a "load follower" mode of operation which requires frequent modifications in the degree of insertion of the groups in the core.

French No. 2,298,859 discloses an inspection procedure and an apparatus which are not for checking control rod clusters but for inspecting fuel rods of a nuclear reactor. The rods are displaced longitudinally with respect to a test unit which delivers a measurement signal. The test unit has a prism endoscope and a yoke with sensors which measure the external diameter of the rods and/or the distance between adjacent rods.

That approach has serious limitations. Visual examination of the surface of the rods only makes it possible to determine if cracks already exist. It does not provide an evaluation of the risk of future occurence of such cracks. The sensors give a measurement of the diameter in one cross-section only. This does not make it possible to prepare a map showing the distribution of wear along the entire length of the rod, or to give an indication of the overall wear.

SUMMARY OF THE INVENTION

It is an object of the invention to provide an improved inspection process of the above-defined type. It is a more specific object to provide a process which makes it possible to subject all rods of a cluster to a first inspection step in order to detect the rods which are prone to be in a critical condition and then, in a second step, to complete the diagnosis on such rods only. In this sense, the invention provides a multifunctional inspection procedure which makes possible an investigation which is only completed on those rods which, from a first examination, appear to present risks of failure.

With that purpose in mind, there is provided a process comprising the steps of (a) longitudinally moving a rod cluster having a plurality n of rods through a control unit while sujecting n/m rods at a time (where n and m are predetermined integers) to eddy current testing; (b) repeating step (a) m−1 times after the cluster has been rotated by successive amounts of 360°/m about the longitudinal direction; and (c) ultrasonically testing doubtful rods revealed during steps (a) and (b) one by one during a longitudinal movement of each doubtful rod in turn over the entire axial length of the doubtful zone and along a plurality of longitudinal profiles in order to provide a detailed map of the doubtful zone.

It will often be of advantage to adopt m=4 if the cluster is for use in a fuel assembly with a square section having a rotational symmetry. In particular, the inspection of clusters which include twenty-four rods frequently used in PWRs may be carried out with only six eddy current coils if such a choice is made. Then the coils may easily be located in the test unit.

If necessary, the process may be completed by a complete visual examination over the entire periphery of one suspected rod at a time with a camera while the rod is reciprocated vertically. In particular, a front face of the rod may be inspected while the rod cluster is lowered and the rear face of the rod may be inspected while the cluster is raised using mirrors which are placed behind the rod and which are associated with the camera.

The visual or ultrasonic examination may be carried out on a doubtful rod which was identified during a previous eddy current test, while an eddy current inspection is being carried out on another set of n/m rods.

BRIEF DESCRIPTION OF THE DRAWINGS

The invention will be better understood from the following description of a particular embodiment given by way of example. The description refers to the accompanying drawings, in which.

DESCRIPTION OF A PREFERRED EMBODIMENT

Figure 1:
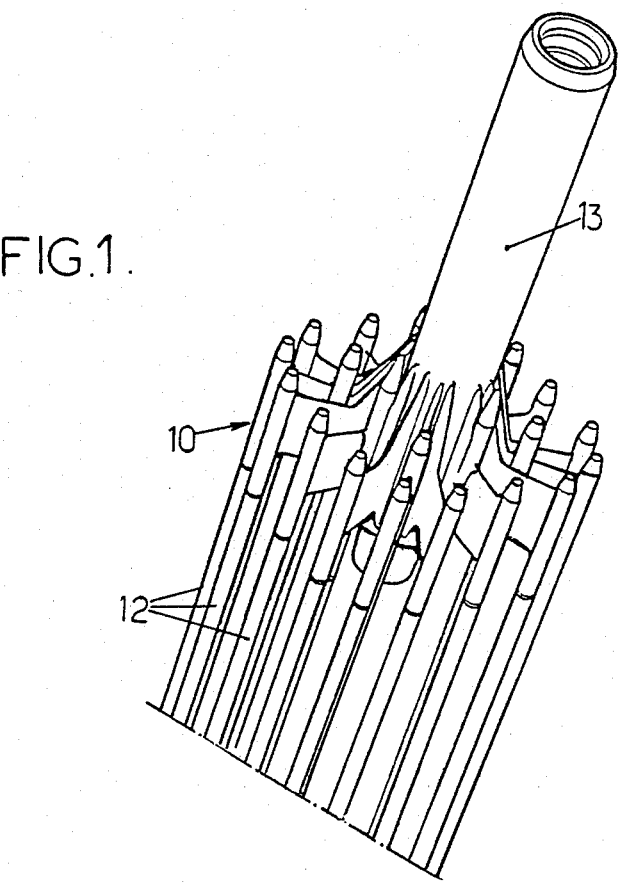
FIG. 1 is a perspective view of the top part of a control cluster of a type presently employed in pressurized water reactors.
Figure 2:
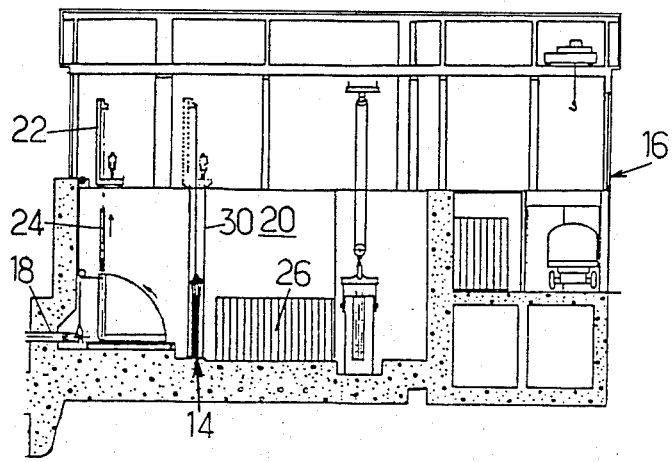
FIG. 2 is a simplified, partially cross-sectional view of a fuel building for a nuclear power plant which can be equipped with a device according to the invention.

The inspection device which will now be described by way of example is suitable for examination of the control clusters of a nuclear reactor whose fuel assemblies have fuel rods distributed at the nodes of a square array. Referring to FIG. 1, a control cluster 10 has twenty-four neutron absorbing rods 12 carried by a spider 13. These rods are dimensioned to slide in and along guide tubes distributed at certain of the 17×17 nodes of the array of fuel rods in the assembly. Each absorbing rod 12 has a conical bullet-shaped end which facilitates insertion into the associated guide tube.

The inspection device 14 will typically be placed in a fuel building 16 located adjacent the nuclear reactor containment (not shown) and will communicate with the containment via a lock chamber 18. The lock chamber opens into a pool accommodating the device 14. A handling machine 22 is provided which may grasp an entire fuel assembly 24 and take it into a storage pit 20. The machine 22 has a cluster handling tool for removing the cluster contained in the fuel assembly and inserting it into the inspection device 14.

Figure 3:
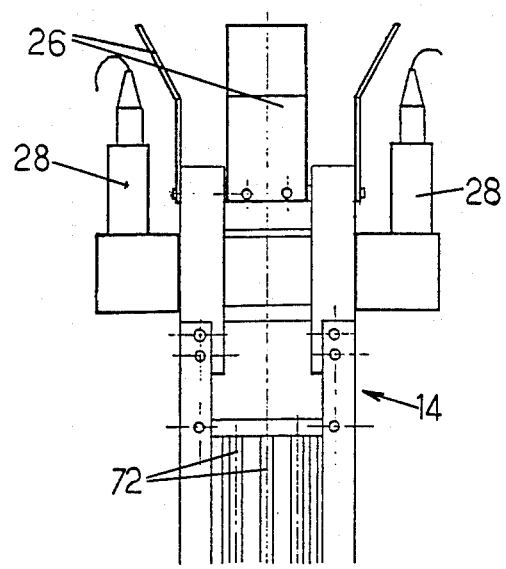
FIG. 3 is a schematic view, in elevation, of the top part of an examination device fitted with deflector vanes whose function is to guide a handling gripper during down movement thereof.

The device 14 may constitute an independent unit which can be handled by the handling machine. Referring to FIG. 3, its top end can be provided with deflecting vanes 26 of bent sheet metal which center and index a gripper at the bottom part of the cluster handling tool. The device may further have lighting lamps 28 in leak tight enclosures for operation within the pool. When an inspection operation has to be carried out, the entire device 14 is placed in an apparatus for immersion at a controllable depth in the pool. In particular, the device may be placed in the basket of a lift 15 which is generally provided in storage pools.

No description will be given of the components for handling the fuel assemblies, the device 14 and the clusters 10 since they can be conventional. As far as the handling tools are concerned, reference may be made to European No. 84 402 050, published under No. 138 711.

Figure 4:
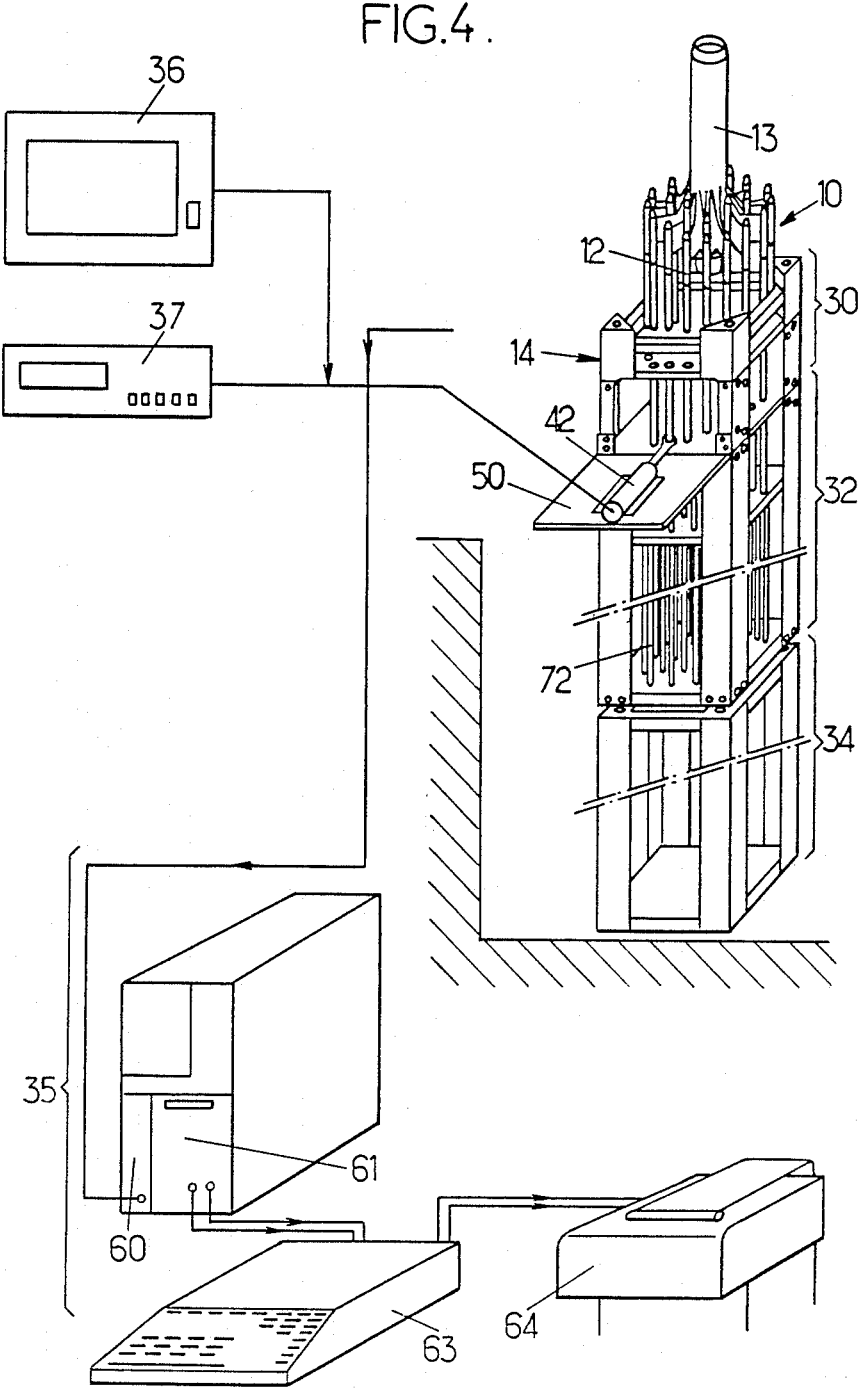
FIG. 4 is a schematic view of the top part of a device in accordance with an embodiment of the invention and a block diagram of the associated components (the deflectors, the ultrasonic mechanism and its electronics not being shown)

Referring to FIG. 4, the device 14 may be considered as having:

an upper support part 30 (FIGS. 5 to 7) which defines an examination zone, a body 32 (FIGS. 5 and 6) carrying vertical guide tubes 72 for the rods of the cluster, a removable spacer or vertical offset block 34 (FIG. 8) which makes it possible to place the device in a fuel storage pit at a height such that the supporting part is above the upper end of the pit, a horizontal table 50 which can be controlled either manually (FIGS. 6 and 7) or remotely (FIG. 13), making it possible to bring an ultrasonic sensor or a camera into an examination zone at eight inspection sites associated with eight respective rod positions.

The device further includes a data processor 35 and a display unit located outside the pool, the function of which is to process the eddy current and ultrasonic signals. It further includes a TV monitor 36 and, if need be, a video tape recorder 37 associated with the video camera 42 which constitutes, in general, the visual inspection unit.

UPPER SUPPORT PART

Figure 5:
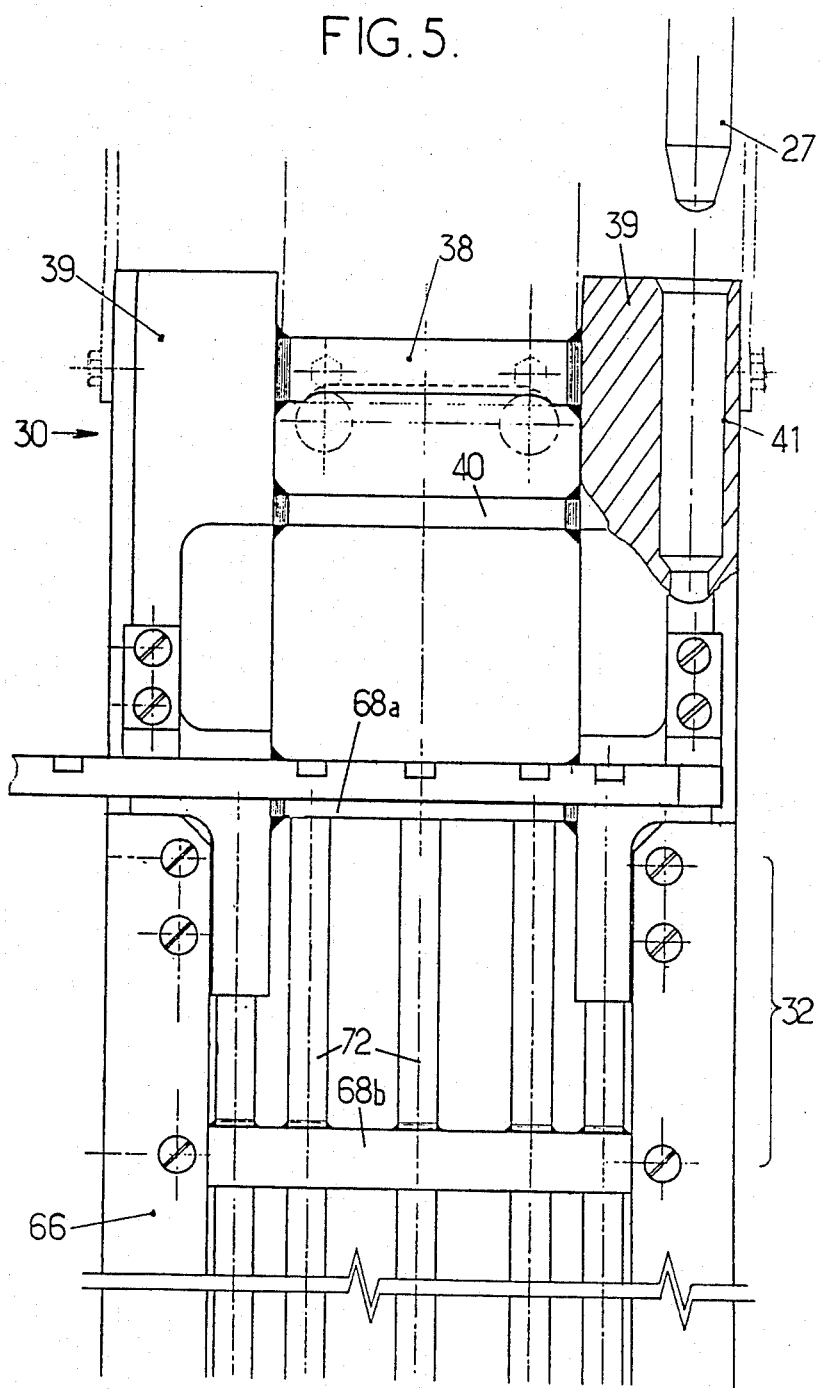
FIG. 5 is a side view of the top supporting plate and the top part of the body of the device shown in FIG. 4.
Figure 6:
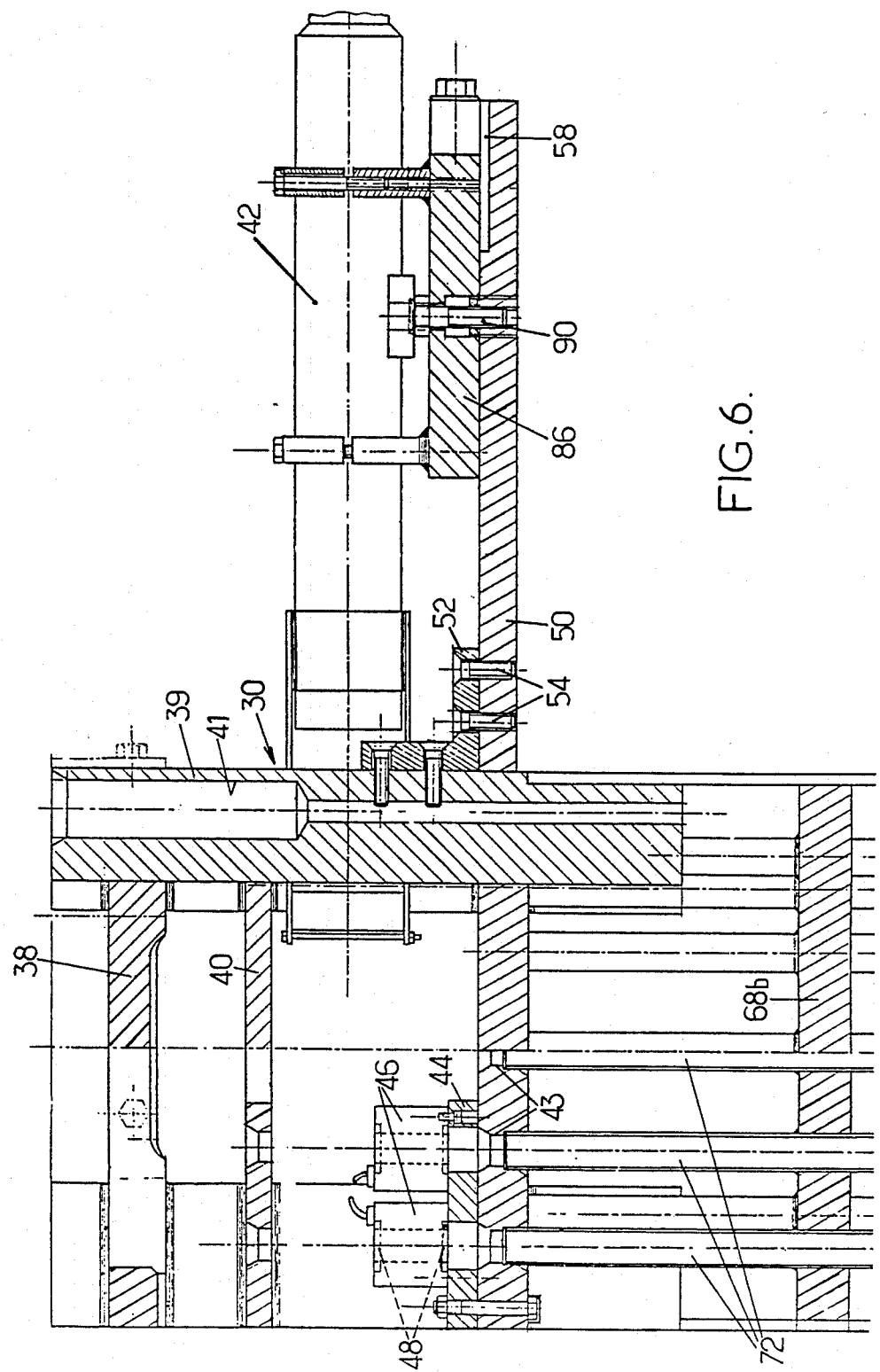
FIG. 6 is a view of the top support plate, of the positioning plate and of the top part of the device shown in FIG. 4, in cross-section taken along plane VI—VI of FIG. 7.
Figure 7:
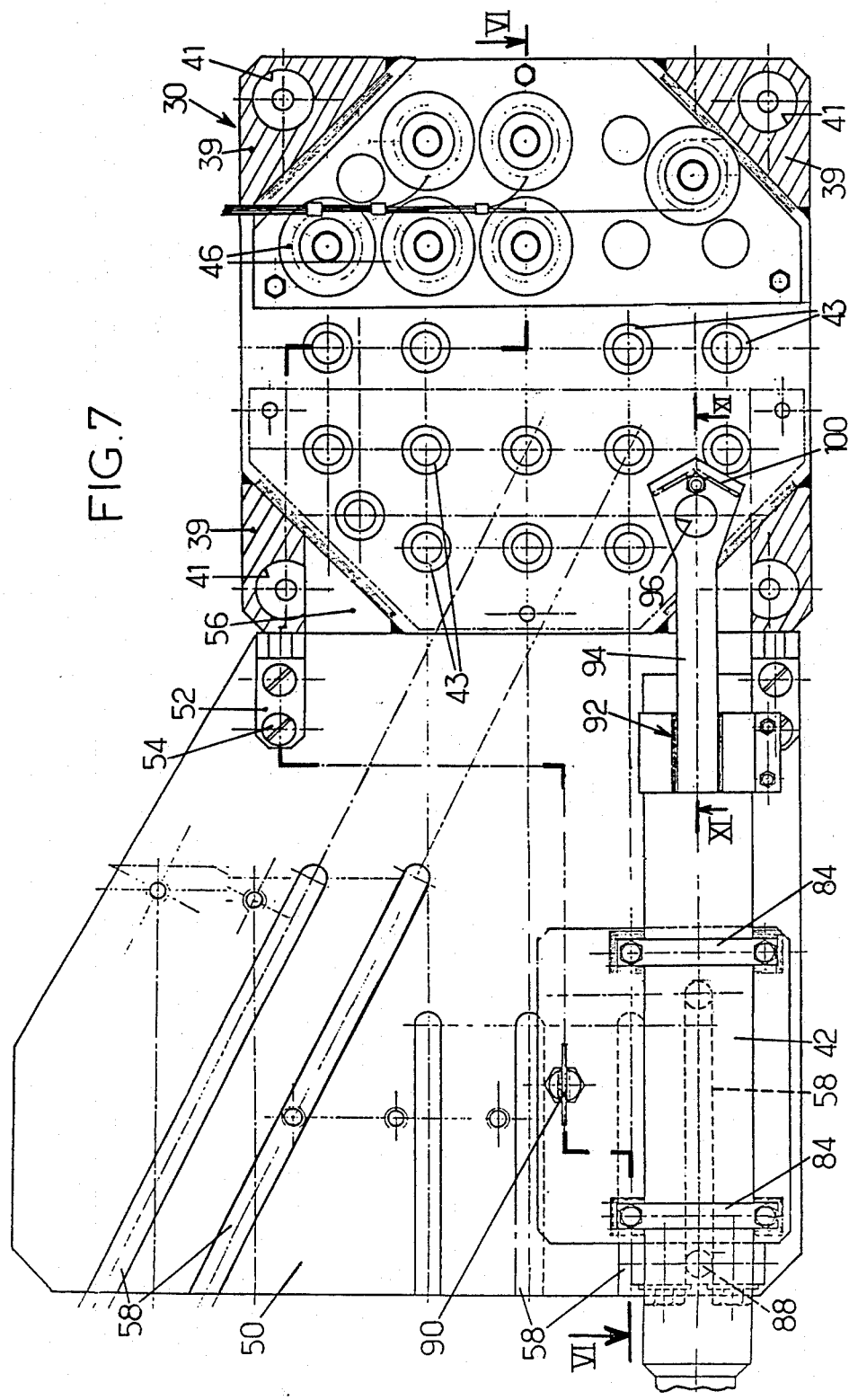
FIG. 7 is a top view of the positioning plate and the top support plate, as seen from a plane directly above the eddy current coils.

Referring to FIGS. 5-7, the upper support part consists of four feet 39 of triangular cross-section which are located at the four corners of a square plate having the same cross-section as a fuel assembly. A bore 41 is provided through each foot 39. For each angular position of a cluster handling tool, two centering and indexing fingers 27 (FIG. 5) carried by the tool engage two of the bores located across a diagonal to position the tool and achieve correct insertion of the cluster.

The feet 39 are mutually connected near the top by welded-on stiffening plates 38 which also serve to receive movable grippers of the fuel-handling tool. The feet 32 are also connected together in their midportion by an adapter plate 40. Twenty-four bores 43 (FIGS. 6 and 7) are formed in the plate 68 in an arrangement which reproduces that of the array of rods 12 in the cluster 10.

The lower part of the supporting port 30 defines a test zone. This zone is equipped with means for eddy current testing and opens towards the table for providing access to the ultrasonic and visual test means.

The eddy current test means are carried by a bedplate 44 having ten traversing holes whose distribution reproduces that of ten rods in the cluster. Eddy current coils 46 are located above six of these holes and each encircles the path of one of the rods. They are associated with a circuitry which may operate them for absolute measurement. A ring 48 is cemented on to each end of each coil for easier centering of the respective rod.

As illustrated, only six coils are provided in an attempt to minimize the bulk. However, a different number of coils may be provided, for example twelve coils. It is possible to have as many coils as there are rods in the cluster if it is desired to carry out the inspection in a single step.

The coils 46 are associated with the data processing equipment which typically includes an oscillator rack 60 (FIG. 4) which provides an electrical signal at the frequency chosen for eddy current testing and a signal processing rack 61 which delivers analog signals which represent projections of the measurement signal in two mutually orthogonal directions in the cross-section of a rod. The signals from the six coils are processed independently by a computer 63 and the result can be displayed on a print-out or a data plotter 64 (FIG. 4).

To compensate for the environment, especially temperature variations, and for the impedance of the cables, it will always be preferable to carry out differential measurements. For this purpose, each of the coils 46 may be associated with a reference coil (not shown) which is identical to the first, surrounds a portion of a brand new rod and is located close to the first coil.

POSITIONING TABLE

A description will now be given of the positioning table 50 shown by way of example in FIGS. 5, 6 and 7. The table is designed for normal adjustment of the position of the optical examining camara 42 and the ultrasonic sensor (not shown). As shown, table 50 consists of a horizontal plate fixed to two of feet 39 as, for example, by angle brackets 52 and screws 54. Openings 56 formed in the two feet 39 which receive the angle brackets provide an access to the test zone from above the table 50. Six slots 58 are formed in the top face of the table and make it possible to retain the camera in any of six different positions each of which corresponds to examination of a rod placed in a different hole 43 (FIG. 7).

Body

Figure 10:
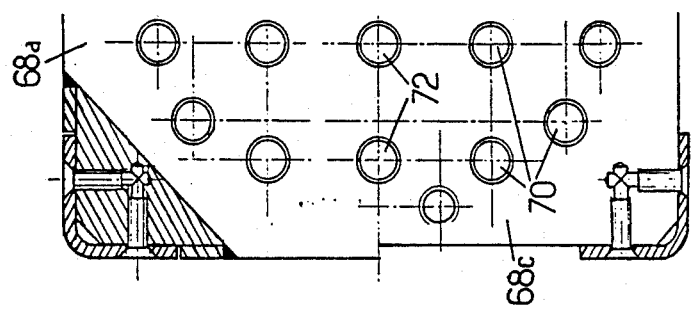
FIG. 10 is a top view showing, at the upper part, the first brace and, at the lower part, the last brace of the body of the device.

Referring to FIG. 5, the body 32 of the device comprises four angle irons 66 joined together by regularly spaced cross-pieces. The upper cross-piece 68a and an intermediate cross-piece 38b are shown in FIG. 5. The upper cross piece 68a and the lower cross-piece 68c are shown in FIG. 10. The feet 39 of the support part 30 are welded on the upper cross-piece 68a. All cross-pieces are formed with aligned holes 70, the distribution of which reproduces that of the array of rods in the cluster. Guide tubes 72 are received in the holes 70, each guide tube 73 having a diameter such that it slidably receives a rod. The cross-pieces and the angle irons can be mutually connected by any appropriate means, such as screws, as shown in FIG. 5.

Spacer Block

Figure 8:
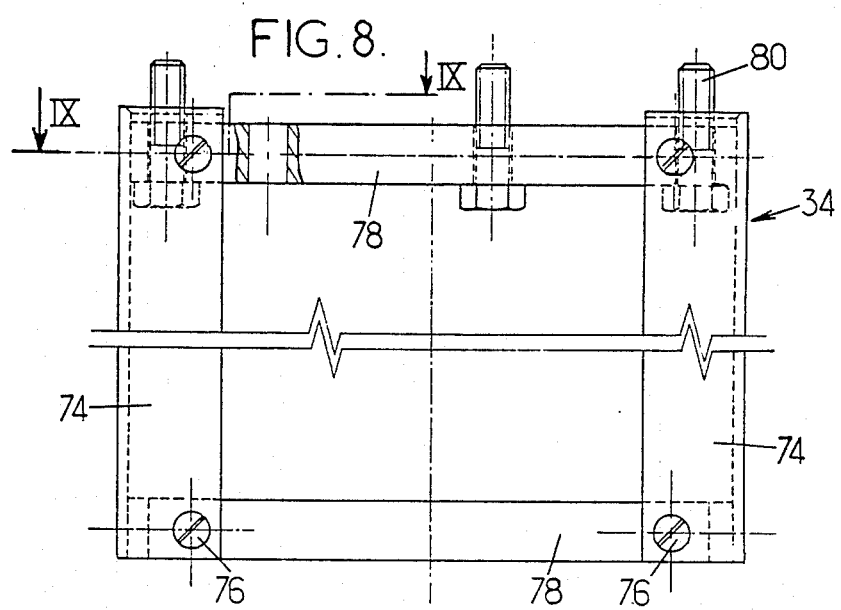
FIG. 8 shows an embodiment of a removable vertical offset block for the examining device.
Figure 9:
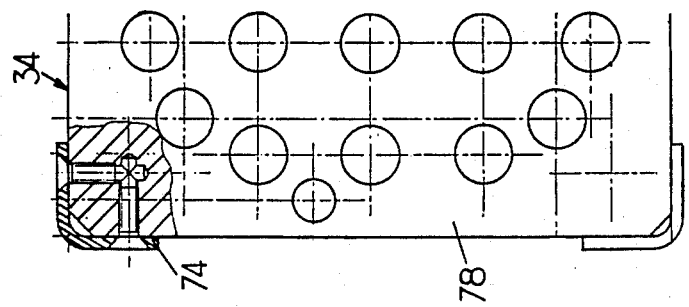
FIG. 9 is a view from above part of the removable block of FIG. 8.

The function of the spacer block 34 is to retain the device in a fuel assembly storage pit at such a level that the table is above the top of the pit. A plurality of blocks of different heights may be provided. Each block may have the general construction shown in FIGS. 8 and 9, which is similar to that of the body. The block 34 has four vertical angle irons 74 fixed by screws 76 (or by any other means) to cross-pieces 78 each formed with twenty-four holes distributed in accordance with the array of rods in the control cluster. Means for fixing the spacer block 34 on the body 32 may be provided. As shown in FIG. 8, they consist of screws 80 which engage threaded holes in the lower cross-piece 68c of the body 32.

VISUAL INSPECTION UNIT

FIGS. 6, 7, 11 and 12 show a visual inspection unit whose sensor element is a camera 42 associated with a mirror holder. The housing of the camera 42 is clamped by two yokes 84 welded to a bedplate 86 whose angular position with respect to one of the retaining slots 58 of table 50 is ensured by two indexing lugs 88 pressfitted in the bedplate 86. A winged screw 90 makes it possible to clamp the bedplate 56 on the table 50.

Figure 11:
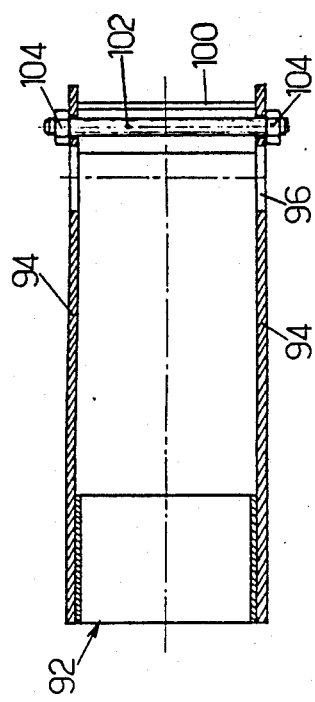
FIG. 11 is a cross-sectional view along line XI—XI of FIG. 7, showing how the visual inspection mirrors are fixed.
Figure 12:
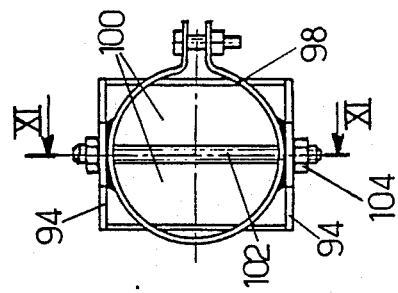
FIG. 12 is a left hand view of FIG. 11.

Referring to FIGS. 7, 11 and 12, the mirror holder 92 is made of two arrow-shaped strips 94. Each strip is formed with a hole 96 for a rod to be tested. The bottom edges of the strips 94 are welded to a clamping collar 98 for attachment of the mirror holder to the body of the camera. Two mirrors 100, at an angle of 120°, are placed at the ends of the strips 94 and are held in place by a rod 102 which theadedly receives tensioning screws 104. The mirrors make it possible to observe the rear face of the rod during inspection if camera 42 is focused on the images furnished by the mirrors rather than on the front face of the rod observed.

ULTRASONIC TEST UNIT

Figure 13:
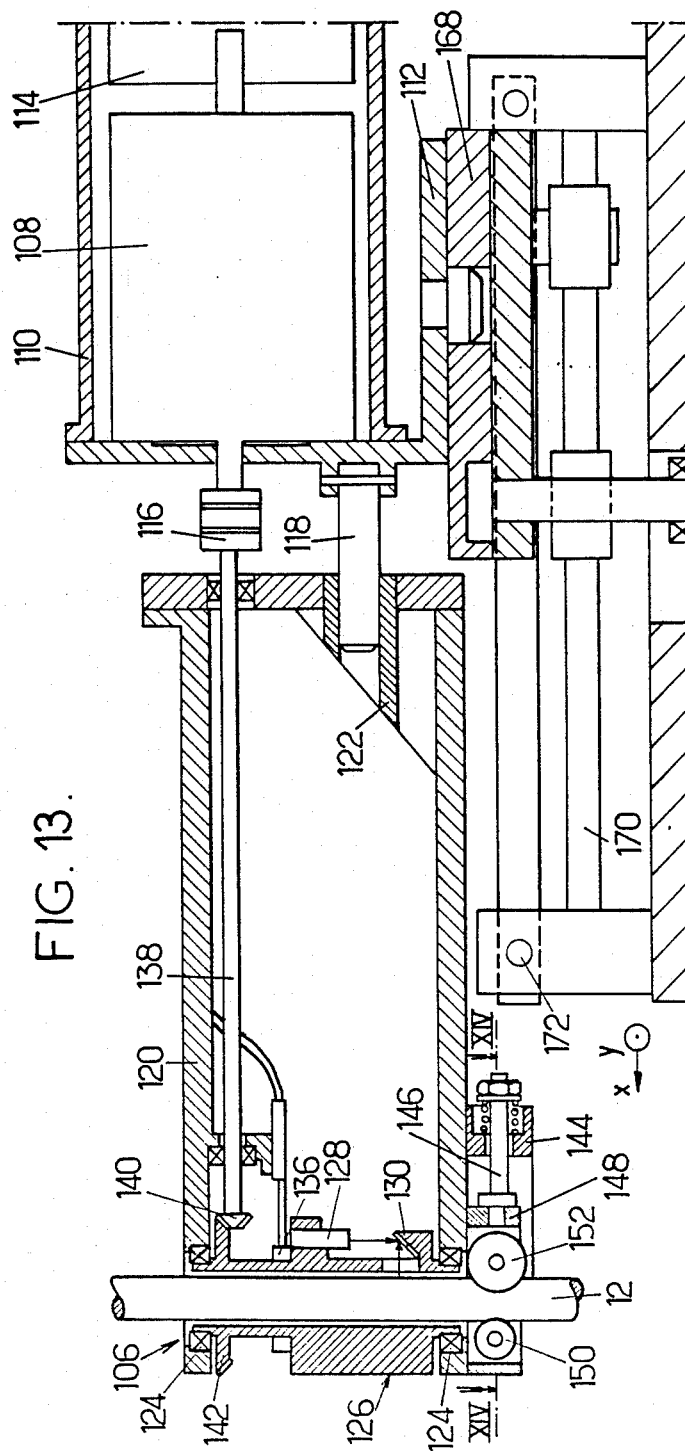
FIG. 13 shows schematically a possible construction of a remotely controlled plate which carries a rotating ultrasonic sensor, in cross-section along a vertical plane.
Figure 14:
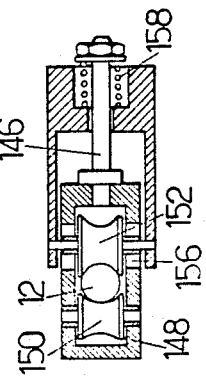
FIG. 14 is a cross-sectional view along line XIV—XIV in FIG. 13.

Referring to FIG. 13, a ultrasonic test unit is mounted on a remotely controlled (rather than manually controlled) table. However, the table could be as shown in FIG. 6.

The ultrasonic test unit 106 may be regarded as having a control block and an inspection block.

The control or drive block is designed to be secured on to the table. It has a fluid-tight casing 110 connected to the table by a square bracket 11 and which contains an electric motor 108 (generally a DC motor) associated with an angle encoder 114. The output shaft of the motor 108 is fitted with a flexible coupling 116 and the tight casing 110 has a horizontal guide column 118 which is parallel to the shaft.

The inspection block is so coupled to the control block that it can accept deformations of the rod 12 to be tested. The inspection block has a support 120 which is connected to the control block by the engagement of the guide column 118 into a guide 122 belonging to the support 120. The guide column 118 allows small amplitude displacements of the support, both in rotation and rectilinearly along the column. This enables the inspection block to adapt to any lack of straightness of the rods 12.

The bottom and top plates of the support 120 are formed with openings accommodating roller bearings 124 which rotatably receive a unit 126 which surrounds the location of the rod 12 to be tested. Unit 126 consists of a rotatable sleeve on which is mounted a focusing ultrasonic transducer sensor 128. As illustrated, the sensor is parallel to the vertical axis of rotation of unit 126. The transmitted and received ultrasound beams are reflected by a tilted mirror 130. Electric supply to the sensor and transmission of the signals are via a rotary electric contact 136.

Unit 126 is drawn in rotation by a mechanism which makes it possible to inspect the entire periphery of a rod with the sensor 128. As shown, the drive mechanism includes a transmission shaft 138 which rotates in bearings carried by the top plate of the support 120. The shaft is connected to the output shaft of the motor 108 by the flexible coupling 116 which tolerates a mutual misalignment of the motor shaft and the transmission shaft. The transmission shaft 138 has an end bevel gear 140 which engages a bevel gear 142 carried by the sleeve element 126.

The ultrasonic inspection unit shown in FIG. 13 additionally includes a device which positions the rod 12 with respect to the sensor 128. This positioning device includes a flexible centering tool carried by the bottom plate of the support plate 120. The centering tool has a yoke 144 fixed to the support plate and slidably receiving a bar 146 for movement towards and away from the rod. The bar 146 carries a carriage 148 rotatably receiving a mobile roller 150 whose shape conforms to that of the rod. A second roller 152 is mounted on a shaft carried by the yoke 144 and can slide in the incisions (slots) 156 in the carriage 148. A return spring 158 biases the carriage 148 in such a direction that the mobile roller 150 forces the rod 12 against the roller 152. Due to this arrangement, the rod will be centered with respect to the ultrasonic sensor 128 while appreciable deformations may be compensated by sliding movement of carriage 148.

As indicated above, the manually set table for the camera can be replaced with a remotely controlled stage which carries the camera, or the ultrasonic inspection unit in a fixed position.

The remotely controlled table shown by way of example in FIG. 13 makes it possible to set the video inspection camera or the ultrasonic sensor 128 in any one of the six positions corresponding to the six rods to be inspected, these six positions advantageously being different from those associated with the eddy current coils.

The table shown in FIG. 13 has a cross-motion table for movements in two horizontal directions x, y. The displacements of the said table, within a limited range, are controlled via a crank-connecting link system. The connecting link 50, whose crank (not shown) can be driven by a motor (not shown) or manually from above the pool, carries a shaft 162 on which is fixed a positioning roller 164. During the longitudinal and rotational movements of the connecting rod 160, caused by the crank (not shown), the roller 164 follows the profile of a cam 166 provided in the plate and drives the tool-carrying plate 168. The cross motion table has a first set of shafts 170 which are parallel to the x direction and a second set of shafts 172 which are parallel to the y direction, allowing the displacement of the plate 112.

Whatever the construction, operation is as follows:

During a first step the cluster of control rods is lowered into the device and six rods of the cluster are simultaneously tested by the eddy current inspection unit. Testing may be carried out during the down and then up movement, and the results are recorded. Once the group has been lifted to its original position, the same operations are repeated with three other angular positions, respectively at 90°, 180° and 270° with respect to the original position. Then, a picture is obtained of the overall wear of each of the rods in the cluster and one can detect those of the rods whose wear (notably by loss of material from the sheaths) is such that they should be inspected more accurately, at least locally.

During a second step, which may, moreover, be carried out at the same time as the first operation occurs on other rods of the same cluster, an inspection is carried out ultrasonically and/or optically.

Ultrasonic inspection is carried out on one rod at a time, which is generally sufficient, since there will be no need to carry out a systematic check on all rods over their entire length. In order to carry out ultrasonic inspection, the ultrasonic sensor is rotated around the rod at the same time as the latter is moved axially. Points distributed every 3° are typically plotted, with a rotation speed of about 60 rpm.

Finally, visual examination is carried out with the TV camera which may be replaced by an endoscope if there is no need for a record. During the down (or up) movement of the rod, the camera is focused on the front face of the rod to be inspected, which makes it possible to detect cracks or fissures visually, or to detect loss of an end plug. During up (or down) movement, the camera is focused on the image through mirror 100, which makes it possible to have a complete image of the rod in the critical zones. The camera or the ultrasonic inspection unit is set in the proper position with respect to the rod to be tested (when use is made of a table as shown in FIG. 6) after the device has been raised with the lift of the pit into a position where the table is within the range of a remotely controlled handling tool; position setting may be with an electric control in the case of a table as shown in FIG. 13.

The invention can be applied whatever the number of rods in a cluster and whatever the nature of the rods, including the case in which they contain fertile material used, for example, to vary the energy spectrum of the neutrons in the reactor.

We claim:

1. A process for inspecting elongate rods of a cluster of n parallel rods, n being a predetermined integer, movable into and out of a reactor core, comprising the steps of:
    (a) longitudinally moving the cluster of rods through a control unit while simultaneously subjecting n/m rods, m being a predetermined integer smaller than n, to eddy current testing throughout the length of said n/m rods;
    (b) repeating step (a) m−1 times after the cluster has been rotated by successive amounts of 360°/m about the longitudinal direction; and
    (c) ultrasonically testing doubtful rods revealed during steps (a) and (b) one by one during a longitudinal movement of each doubtful rod in turn over the entire axial length of the doubtful zone and along a plurality of longitudinal profiles in order to provide a detailed map of the doubtful zone.

2. A process according to claim 1 further comprising the step of complete visual examination over the entire periphery of one doubtful rod at a time during descent and re-ascent of said rod, inspection being carried out on the front face of the rod while the cluster is being lowered and on the rear face while the cluster is raised with the use of mirrors placed behind the rod.

3. A process according to claim 2 wherein a TV camera is used for remote visual inspection.

4. A process according to claim 2 wherein the visual or ultrasonic examination of a doubtful rod detected during a previous eddy current inspection is carried out at the same time as eddy current inspection on a set of n/m other rods.

5. A process for inspecting elongate rods of a cluster of n parallel rods having a rotational symmetry of order 4 about an axis, vertically movable into and out of a nuclear reactor for control of the reactor, comprising the successive steps of:
    (a) progressively moving the rods downwardly substantially over their complete length through a stationary control unit while subjecting n/4 of said rods to individual and simultaneous eddy current testing;
    (b) repeating step (a) three times, each time after the cluster has been rotated by 90° about said axis; and
    (c) ultrasonically testing doubtful rods revealed during steps (a) and (b) one by one during a longitudinal movement of each doubtful rod in turn over the entire axial length of a doubtful zone and along a plurality of longitudinal profiles in order to provide a detailed map of the doubtful zone.

6. An inspection device for inspecting the rods of a cluster of rods vertically movable into and out of the core of a nuclear reactor, comprising: a support plate; guide means fast with said support plate and arranged for slidably receiving the rods of said cluster in m different angular positions of the cluster about a vertical axis, said support plate having passages which are traversed by the rods during their slidable movement; a plurality n/m of eddy current coils, n being the total number of rods in the cluster which is a multiple of m, m being an integer greater than one, each arranged for being transversed by said rod during sliding movement thereof along said guide means; data processor means arranged to receive detection signals from said coils; and means for inspection of at least one rod at a time during vertical sliding movement of said rod, said means for inspection including at least one of ultrasonic and visual inspection means.

7. A device according to claim 6 wherein each of said eddy current coils is associated, in a differential arrangement, with a second coil which encircles a new rod, the arrangement being such as to provide a signal which is dependent on the state of wear in a section of the rod examined with reference to a new section, thereby compensating for environmental effect.

8. A device according to claim 6, for examining clusters for use in fuel assemblies in which the rods are distributed in a square array, wherein the device is provided to receive the group in $m=4$ different angular positions.

9. A device according to claim 6, wherein the inspection means include an ultrasonic focussing sensor mounted on a movable element mounted on said support plate for rotation about a rod and means to turn the moving element around the rod to be inspected in order to obtain a complete representation of the latter.

10. A device according to claim 9, wherein said sensor has a sensing axis parallel to the axis of the rod and said inspection means further include means to direct the transmitted ultrasonic beam toward the rod and the reflected ultrasonic beam towards the sensor.

11. A device according to claim 6, wherein the inspection means include a camera carried by a support formed with a passage for the rod to be examined and with means for receiving said inspection means in any one of a plurality of positions each corresponding to inspection of a particular one of said rods in the cluster.

12. A device according to claim 6, wherein said means are for inspection of one rod only at a time.

13. A device according to claim 6, wherein said means for inspection of at least one rod at a time are located for inspection of at least one rod different from those rods which traverse said eddy current coils during sliding movement thereof.

* * * * *